(12) United States Patent
DeRosa et al.

(10) Patent No.: US 9,470,596 B2
(45) Date of Patent: *Oct. 18, 2016

(54) TUNABLE PRESSURE TRANSDUCER ASSEMBLY

(71) Applicant: Kulite Semiconductor Products, Inc., Leonia, NJ (US)

(72) Inventors: Louis DeRosa, Wayne, NJ (US); Robert Gardner, Westwood, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 203 days.

This patent is subject to a terminal disclaimer.

(21) Appl. No.: 14/187,376

(22) Filed: Feb. 24, 2014

(65) Prior Publication Data

US 2014/0165732 A1    Jun. 19, 2014

Related U.S. Application Data

(63) Continuation of application No. 13/229,822, filed on Sep. 12, 2011, now Pat. No. 8,707,791.

(60) Provisional application No. 61/381,734, filed on Sep. 10, 2010.

(51) Int. Cl.
*G01L 19/06* (2006.01)
*G01L 19/00* (2006.01)

(52) U.S. Cl.
CPC ....... *G01L 19/0609* (2013.01); *G01L 19/0007* (2013.01); *Y10T 29/49764* (2015.01)

(58) Field of Classification Search
None
See application file for complete search history.

(56) References Cited

U.S. PATENT DOCUMENTS

| | | | |
|---|---|---|---|
| 2011/0107840 A1* | 5/2011 | Kurtz | G01L 9/0052 73/714 |
| 2012/0011936 A1* | 1/2012 | Hurst | G01L 19/0609 73/702 |
| 2014/0041457 A1* | 2/2014 | Kurtz | G01L 9/06 73/707 |
| 2014/0260519 A1* | 9/2014 | Hurst | G01L 27/002 73/1.57 |

* cited by examiner

*Primary Examiner* — Andre Allen
(74) *Attorney, Agent, or Firm* — Troutman Sanders LLP; James E. Schultz; Mark Lehi Jones

(57) ABSTRACT

A tunable pressure transducer assembly that comprises a sensing element disposed within a housing, wherein the sensing element is adapted to output a signal substantially indicative of an applied pressure, and a filter assembly also disposed within the housing. In one example embodiment, a method includes receiving, at a filter assembly having a tube, a cap and a cavity defined by a housing, a pressure, wherein the cap is positioned to set a predetermined volume of the cavity and the tube is associated with an application of the pressure to the cavity, wherein the pressure includes a static pressure component and a dynamic pressure component; filtering, by the tube and the cavity, at least a portion of the dynamic pressure component of the pressure to obtain a filtered pressure; outputting, from the filter assembly, the filtered pressure; and wherein the filtered pressure is used to determine the static pressure component of the pressure.

18 Claims, 1 Drawing Sheet

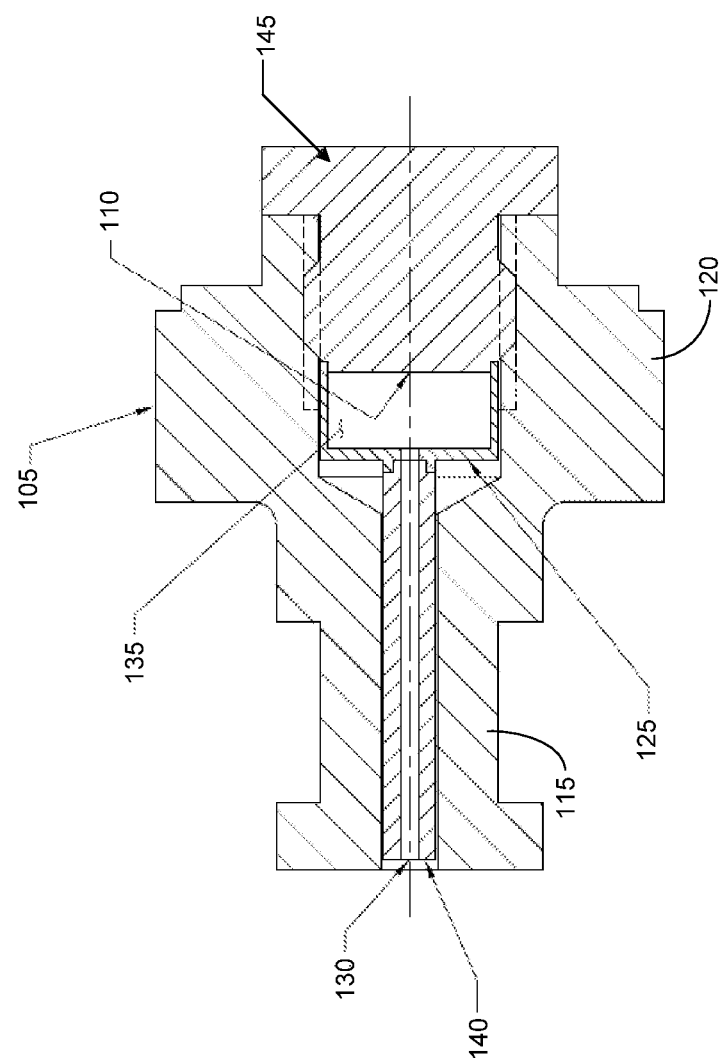

TUNABLE PRESSURE TRANSDUCER ASSEMBLY

CROSS-REFERENCE TO RELATED APPLICATION

This application is a continuation application claiming priority under 35 U.S.C. §120 to co-pending U.S. patent application Ser. No. 13/229,822, entitled "TUNABLE PRESSURE TRANSDUCER ASSEMBLY," filed Sep. 12, 2011, which claims priority under 35 U.S.C. §119(e) to U.S. Prov. App. No. 61/381,734, entitled "METHOD OF TUNING INPUT FREQUENCY RESPONSE OF A PRESSURE TRANSDUCER," filed Sep. 10, 2010, and all of which are hereby incorporated by reference as if fully set forth herein.

BACKGROUND

Pressure transducer assemblies used to measure pressure in various systems, for example, gas turbine engines, are adversely impacted by pressure ripples often caused by pumping equipment. If high frequency pressure ripples are applied near a resonance frequency of the pressure transducer, either from an internal cavity or a mechanical structure, the pressure ripples can negatively impact and shorten the life expectancy of the pressure transducer. One way to avoid this undesirable situation is to design a pressure transducer that has minimal or no resonances near the frequency of the ripple. This can, however, be costly and time consuming as pressure ripple frequencies can change from system to system. Therefore, different pressure transducers must be designed for each unique system.

In some cases, it is not desirable to measure the pressure ripple of a system. Instead, only steady state pressure level measurements are desired. In these cases, a filter assembly may be placed at the front end of the transducer to eliminate the higher frequency ripples and leave static and quasi-static pressures intact. Many embodiments of the prior art utilize a filter assembly specifically designed for each individual system to be measured, which can be very costly as the filter assemblies are not equipped to adapt to various systems.

Thus, there is a need for a pressure transducer assembly that comprises a tunable filter assembly that can adapt to multiple systems and applications, which therefore reduces costs associated with designing individual filters for individual systems and applications.

BRIEF SUMMARY

The various embodiments of the present invention provide a tunable pressure transducer assembly that comprises a sensing element disposed within a housing, wherein the sensing element is adapted to output a signal substantially indicative of an applied pressure, and a filter assembly also disposed within the housing. The filter assembly comprises a cap and a tube, wherein the cap is spaced from the sensing element within the housing such that it encloses a set volume around the sensing element, and wherein the tube controls access of the applied pressure to the set volume. The filter assembly is operative to substantially reduce high frequency pressure ripples and allow static and quasi-static pressures to pass through to the sensing element, and may be manipulated to tune the pressure transducer assembly to achieve a desired dampening frequency. The filter assembly therefore enables one pressure transducer assembly outline to be tunable for measuring pressure in many different systems.

BRIEF DESCRIPTION OF THE FIGURES

FIG. 1 illustrates an embodiment of a tunable pressure transducer assembly in accordance with exemplary embodiments of the present invention.

DETAILED DESCRIPTION

Although preferred embodiments of the invention are explained in detail, it is to be understood that other embodiments are contemplated. Accordingly, it is not intended that the invention is limited in its scope to the details of construction and arrangement of components set forth in the following description or illustrated in the drawings. The invention is capable of other embodiments and of being practiced or carried out in various ways. Also, in describing the preferred embodiments, specific terminology will be resorted to for the sake of clarity.

It must also be noted that, as used in the specification and the appended claims, the singular forms "a," "an," and "the" include plural referents unless the context clearly dictates otherwise.

Also, in describing the preferred embodiments, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" one particular value and/or to "about" or "approximately" another particular value. When such a range is expressed, another embodiment includes from the one particular value and/or to the other particular value.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

Referring now to the drawings, in which like numerals represent like elements, exemplary embodiments of the present invention are herein described. It is to be understood that the figures and descriptions of the present invention have been simplified to illustrate elements that are relevant for a clear understanding of the present invention, while eliminating, for purposes of clarity, many other elements found in typical pressure transducer assemblies and methods of making and using the same. Those of ordinary skill in the art will recognize that other elements are desirable and/or required in order to implement the present invention. However, because such elements are well known in the art, and because they do not facilitate a better understanding of the present invention, a discussion of such elements is not provided herein.

Exemplary embodiments of the present invention provide a tunable pressure transducer assembly that utilizes a filter assembly adapted to tune the pressure transducer assembly to a desired attenuation frequency to avoid resonant conditions. Therefore, several pressure transducer assemblies having the same outline can be manufactured, and each assembly can be subsequently tuned to a desired system, thereby reducing costs associated with designing one unique pressure transducer assembly for one unique system. As illustrated in FIG. 1, the pressure transducer assembly 100 comprises a housing 105 having a first end 115 and a second end 120. A sensing element 110 mounted on a header 145 is disposed within the second end 120 of the housing 105. The housing 105 surrounds the sensing element 110 and therefore protects the sensing element 110 from harsh external environments. In exemplary embodiments, the sensing element 110 is a piezoresistive sensing element that comprises four piezoresistors. As designed, the sensing element 110 measures an applied pressure media and outputs a signal substantially indicative of the applied pressure media. One skilled in the art will appreciate that the housing 105 can be customized to fit many configurations, for example but not limited to, O-ring seals and threads.

A filter assembly comprising a cap 125 and a tube 130 is also disposed within the housing 105. The cap 125 encloses a set volume 135 around the sensing element 110 near the second end 120 of the housing 105. The tube 130 fits within a channel 140 defined within the housing 105 and extends from the first end 115 of the housing 105 to the cap 125, such that it is adjacent and detachably attached to the cap 125.

An incoming pressure media is applied to the first end 115 of the housing 105 and received by the channel 140 defined within the housing 105 and the tube 130. The pressure media flows through the tube 130 and thus, the tube 130 may control access of the pressure media to the cap 125 and into the set volume 135. The flow and frequency of the pressure media may be restricted by changing the dimensions of the tube 130 and cap 125 (and, consequently the area of the set volume 135). Therefore, the cap 125 and tube 130, in combination, may act as a low pass mechanical filter.

As described, the pressure transducer assembly 100 may be tuned to achieve a desired attenuation frequency. Those skilled in the art will appreciate that certain pressure media comprise high frequency pressure ripples that interfere with the accuracy of the sensing element and shorten its operable lifespan. The pressure transducer assembly of the present invention may be tuned via the filter assembly to eliminate undesirable high frequency ripples and pass through desirable static and quasi-static pressures. Specifically, dependent on the properties of the pressure media to be measured, such as its viscosity, the length and diameter of the cap 125 and tube 130 may be adjusted to achieve desired dampening parameters. While the diameters of the cap 125 and tube 130 may fluctuate, in exemplary embodiments, the diameters of the cap 125 and the tube 130 remain fixed across many different systems. As illustrated in FIG. 1, the diameter of the tube 130 is smaller than the diameter of the cap 125 to effectively attenuate high frequency ripples.

One skilled in the art will appreciate that narrowing the tube 130 (i.e., decreasing the diameter) enhances attenuation. However, if the tube 130 is too narrow for the applied pressure media, desirable low frequency components (e.g., static and quasi-static pressures) may also be eliminated, which interferes with the accuracy of the sensing element 105. Conversely, if the tube 130 is too wide, high frequency ripples may not sufficiently eliminated, which also interferes with the accuracy of the sensing element 105 and decreases it operable lifespan.

Further, by varying only the length of the tube 130 and the cap 125, one single pressure transducer assembly design may be tuned to many different systems having varying pressure media properties. The actual length of the tube 130 and cap 125 can be changed, or, and more preferably, the length of the tube 130 and the set volume 135 via the cap 125 may be adjusted by sliding the filter assembly within the pressure transducer assembly 100. For example, to "shorten" the filter assembly, the tube 130 can be pushed towards the second end 120 of the pressure transducer assembly 100, which consequently pushes the cap 125 closer to the sensing element 110 and reduces the area of the set volume 135 around the sensing element 135. It is important to note that shortening the tube 130 exposes the pressure media to more of the channel 140 defined within the housing 105, however the channel 140 has minimal influence on the overall frequency response.

Conversely, to "lengthen" the filter assembly, the tube 130 can be pulled away from the second end 120 of the pressure transducer assembly 100 towards the first end 115 of the pressure transducer assembly, which consequently moves the cap 125 further away from the sensing element 110 and increases the area of the set volume 130 around the sensing element 125. Because the filter assembly can slide within the pressure transducer assembly to vary the filter properties, several pressure transducer assemblies having the same outline can be manufactured, and each assembly can be subsequently tuned to a desired system, thereby reducing costs associated with designing one unique pressure transducer assembly for one unique system. Once the desired tuning is achieved, the filter assembly may be fixed within the housing 105 using, for example, standard welding techniques.

Those skilled in art will appreciate that the equation below shows the wave equation for the flow of pressure through a pipe. The damping coefficient, $$K\frac{32\mu}{\rho D^2},$$

is dependent on both pipe diameter (D) and viscosity ($\mu$).

$$\frac{1}{c^2}\left(\frac{\partial^2 P'}{\partial t^2} + K\frac{32\mu}{\rho D^2}\frac{\partial P'}{\partial t}\right) = \frac{\partial^2 P'}{\partial x^2}$$

As the equation illustrates, when the flow is in a tube 130 having a smaller diameter, the damping is increased due to its narrow diameter and long length. As the flow reaches the cap 125 and the set volume 135, the flow is further damped as it expands to fulfill the diameter of the cap 125 and the area of set volume 135. By manipulating the length of the tube 130 and area of the set volume 135, by moving the cap closer or further from the sensing element 110, the damping ratio and cut-off frequency can be well tuned for the respective application. In this way, undesired ripple frequency can be substantially or completely eliminated, while still retaining lower frequency components that are desirable to measure.

Numerous characteristics and advantages have been set forth in the foregoing description, together with details of structure and function. While the invention has been disclosed in several forms, it will be apparent to those skilled in the art that many modifications, additions, and deletions, especially in matters of shape, size, and arrangement of parts, can be made therein without departing from the spirit and scope of the invention and its equivalents as set forth in the following claims. Therefore, other modifications or embodiments as may be suggested by the teachings herein are particularly reserved as they fall within the breadth and scope of the claims here appended.

What is claimed is:
1. A method, comprising:
receiving, at a filter assembly having a tube, a cap and a cavity defined by a housing, a pressure, wherein the cap is positioned to set a predetermined volume of the cavity, and wherein the tube and the cap are slideably disposed within the housing, the tube is associated with an application of the pressure to the cavity and the pressure includes a static pressure component and a dynamic pressure component;

filtering, by the tube and the cavity, at least a portion of the dynamic pressure component of the pressure to obtain a filtered pressure;

outputting, from the filter assembly, the filtered pressure; and wherein the filtered pressure is used to determine the static pressure component of the pressure.

2. The method of claim 1, further comprising:
receiving, at a sensing element, the filtered pressure;
measuring, by the sensing element, the filtered pressure to obtain a filtered pressure signal; and
outputting, by the sensing element, the filtered pressure signal.

3. The method of claim 2, wherein the sensing element is disposed in the housing and the cap is spaced from the sensing element within the housing to set the predetermined volume of the cavity.

4. The method of claim 1, wherein the cap is slideably disposed within the housing.

5. The method of claim 1, wherein the cap slides within the housing to tune the filter assembly to a desired dampening frequency.

6. The method of claim 1, wherein the tube and the cap slide within the housing to tune the filter assembly to a desired dampening frequency.

7. The method of claim 1, wherein the cap is of a first cross-section and the tube is of a second cross-section, wherein the first cross-section is greater than the second cross-section.

8. The method of claim 1, wherein a length of the tube is changed to manipulate a filter property of the filter assembly.

9. The method of claim 1, wherein the predetermined volume of the cavity is changed to manipulate a filter property of the filter assembly.

10. A system, comprising:
a filter assembly having a tube, a cap and a cavity defined by a housing, wherein the cap is positioned to set a predetermined volume of the cavity, and wherein the tube and the cap are slideably disposed within the housing, the tube is associated with an application of a pressure to the cavity and the pressure includes a static pressure component and a dynamic pressure component, wherein the filter assembly is configured to:
receive the pressure, wherein the pressure includes a static pressure component and a dynamic pressure component;
filter, by the tube and the cavity, at least a portion of the dynamic pressure component of the pressure to obtain a filtered pressure;
output the filtered pressure; and
wherein the filtered pressure is used to determine the static pressure component of the pressure.

11. The system of claim 10, further comprising:
a sensing element disposed in the housing and operationally coupled to the filter assembly, wherein the sensing element is configured to:
receive the filtered pressure;
measure the filtered pressure to obtain a filtered pressure signal; and
output the filtered pressure signal.

12. The system of claim 11, wherein the cap is spaced from the sensing element within the housing to define the predetermined volume of the cavity.

13. The system of claim 10, wherein the cap is slideably disposed within the housing.

14. The system of claim 10, wherein the cap slides within the housing to tune the filter assembly to a desired dampening frequency.

15. The system of claim 10, wherein the tube and the cap slide within the housing to tune the filter assembly to a desired dampening frequency.

16. The system of claim 10, wherein the cap is of a first cross-section and the tube is of a second cross-section, wherein the first cross-section is greater than the second cross-section.

17. The system of claim 10, wherein a length of the tube is changed to manipulate a filter property of the filter assembly.

18. The system of claim 10, wherein the predetermined volume of the cavity is changed to manipulate a filter property of the filter assembly.

* * * * *